April 16, 1929.  E. E. HAWKINSON  1,709,821
MOLD STRIPPING MACHINE
Filed April 16, 1928   2 Sheets-Sheet 2
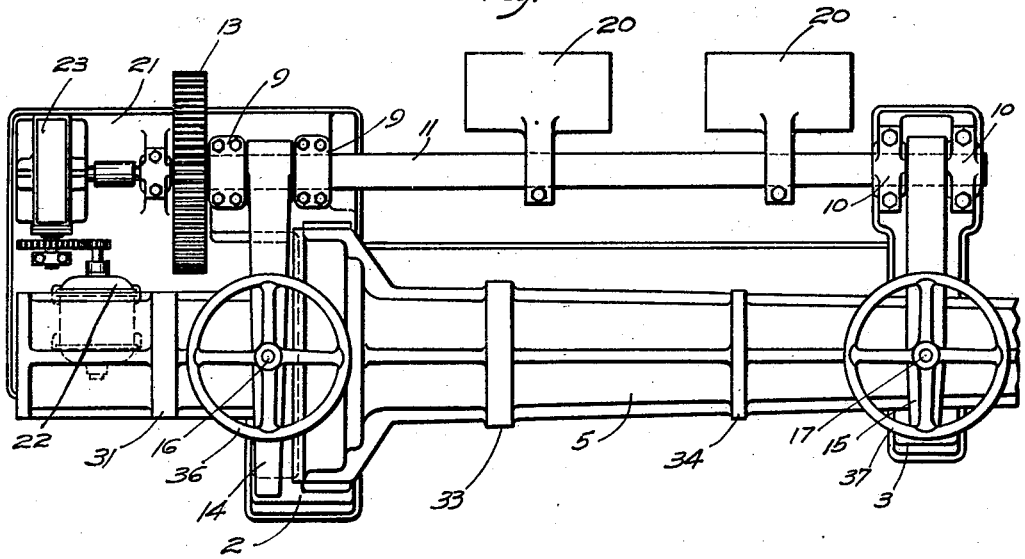
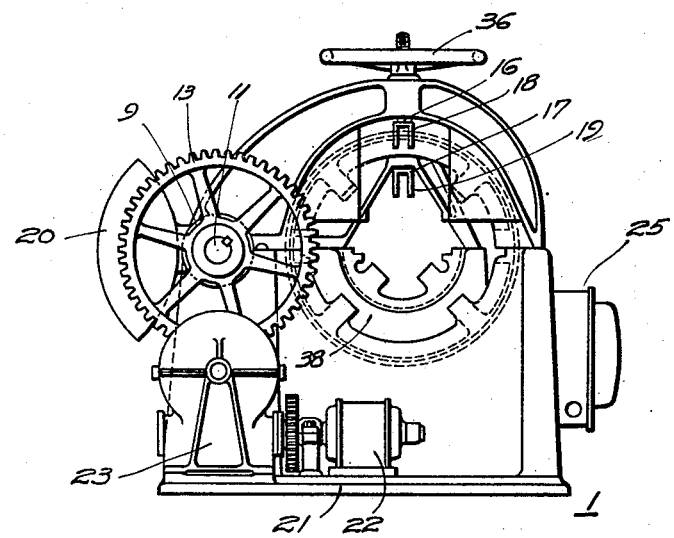
INVENTOR
*Emil E. Hawkinson.*
BY
*(signature)*
ATTORNEY Patented Apr. 16, 1929.

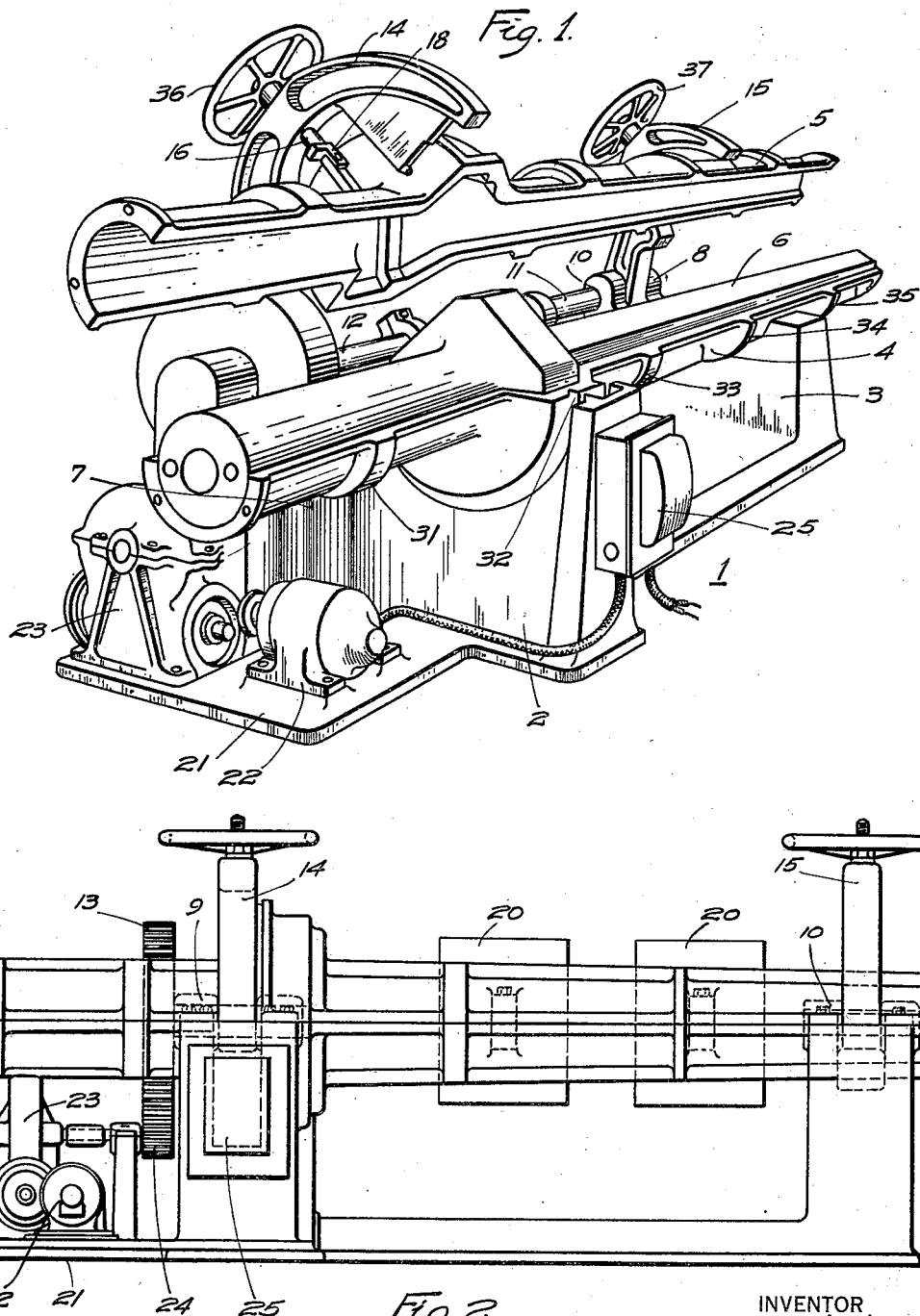

1,709,821

UNITED STATES PATENT OFFICE.

EMIL E. HAWKINSON, OF SOUTH BEND, INDIANA, ASSIGNOR TO WESTINGHOUSE ELECTRIC & MANUFACTURING COMPANY, A CORPORATION OF PENNSYLVANIA.

MOLD-STRIPPING MACHINE.

Application filed April 16, 1928. Serial No. 270,200.

My invention relates to the art of molding bodies from plastic and cementitious material and has particular relation to a machine for disengaging the molds from the molded bodies after the completion of the molding process.

In the making of articles of concrete, and especially in the making of heavy articles, such as lighting standards, difficulty is encountered in removing the mold from the molded article after the molding process has been completed and the cement has permanently set. The articles are sometimes broken or chipped if the process of removing the molds is not carefully practiced, and spoilage results.

Therefore, an object of my invention is to provide a machine which will remove the molds from molded articles without chipping or breaking the molded articles.

Another object of my invention is to provide a motor driven machine for handling the molds, thereby eliminating a considerable amount of hand labor and hastening the completion of the process.

Other objects of my invention will become apparent from the following description of the construction and operation of my device.

Figure 1 is a perspective view of my mold-stripping machine set up for operation with a mold and a molded article in place;

Fig. 2 is a side elevational view;

Fig. 3 is a plan view;

Fig. 4 is an end elevational view of the machine.

Referring to the drawings, the mold-stripping machine comprises a base 1 having two pedestal bearings, 2 and 3 constituting parts thereof.

A portion of each pedestal bearing constitutes a mounting for rotatably engaging the two-piece mold 4 and 5 in which a concrete standard 6 has been molded. The rear portions 7 and 8 of the two pedestals constitute bearings 9 and 10 for a countershaft 11, having a relatively heavy gear 13 mounted on the left hand end 12. Two spaced supporting arms 14 and 15 are fastened to the countershaft 11 and extend out over the mold at pedestals 2 and 3.

Two spindles 16 and 17 extend vertically through the supporting arms and are provided with clevis members 18 and 19 for engaging the upper half 5 of the mold.

Counterweights 20 are employed to counterbalance the weight of the supporting arms and the upper half of the mold. A portion 21 of the bed to the left of the pedestal 2 constitutes a platform on which a motor 22 and a reduction-worm-gearing assembly 23 is mounted. The motor 22 is employed to rotate the countershaft 11 through pinion 24, gear wheel 13 and gearing 23. Control box 25, mounted on the large pedestal, controls the operation of the motor and is used to reverse the direction of rotation of the motor to raise and lower the supporting arms.

Most standards are molded in two-piece molds, such as the one shown in Fig. 1, and the centrifugal process is preferably employed. The mold shown in Fig. 1 is preferably provided with large journal surfaces or tires 31, 32, 33, 34 and 35 along its length. The centrifugal process packs the cement at the outer portions of the pole, and, consequently, the pole may be tightly engaged in the mold after curing the cement.

In operation, the mold is placed in the mold-stripping machine so that the parting line of the mold is in a horizontal plane, and the bolts utilized in fastening the mold together are removed.

The supporting arms 14 and 15 are then lowered over the pole and the spindles 16 and 17 are engaged by means of the clevis members 18 and 19, with suitable portions of the mold. The hand wheels 36 and 37, which engage screw threads on the spindles 16 and 17, are then screwed down the threads of spindles 16 and 17 to effect a direct upward pull on the upper half 5 of the mold.

The weight of the pole and the lower half of the mold is sufficient to keep them in place on the pedestals. After an initial strain has been put on the upper half 5 of the mold, the mold is tapped with a soft metal hammer until the mold is freed from the pole. It may then be raised by the hand wheels entirely away from the pole. If desired, a rapping machine, well known in the art, may be mounted on the supporting arms or the upper half of the mold or in the pedestal 2 in such manner that the mold is vibrated during the removal operation.

After the upper half of the mold has been disengaged from the pole, it is lowered, the spindles are disengaged and the upper half of the mold taken from the machine by means of a crane or the like.

A special shoe 38, adapted to rest on the pedestal bearing 2 and support the pole 6 at its lower end, and a second shoe, adapted to rest on the pedestal bearing 3 and support the pole 6 at its upper end, are placed on the pole and the latter, together with the lower half of the mold and the shoes may be rotated through 180°.

The mold-removing operation is then repeated and the lower half of the mold, now in the upper position, is removed. The upper half of the mold may then be swung back out of the way by moving the supporting arms by the motor, reduction gearing and countershaft 11, and the pole removed from the mold and set aside for the finishing operation and further curing. The lower mold half is lowered into place on the pedestals, and removed from the machine. The mold halves are then cleaned, fastened together, and made ready for molding another pole.

It is apparent that, with my machine, a considerable portion of the hand labor is eliminated and one man may perform the entire operation of removing or stripping the mold from the molded article. Since the molds are removed directly upward, and may be moved gradually and uniformly, the whole mold being moved at one time, spoilage, such as chipping and breaking of the pole and injury to the molds, is greatly reduced or entirely obviated.

Although I have shown and described a specific modification of my device, it is apparent that other modifications may be made by those skilled in the art. For instance, the machine may be adapted to be utilized with molds having more than two parts. Such modifications may be made without departing from the spirit and scope of my invention, as defined in the appended claims.

I claim as my invention:

1. A power-driven machine for use in removing molds from molded articles including supporting arms for engaging the mold, rotatable about a horizontal axis and driven by a prime mover.

2. A power-driven machine for use in removing molds from molded articles including supporting arms rotatable about a horizontal axis and having vertically disposed engaging means for imparting an initial direct radial pull on the mold.

3. In a mold stripping machine, means for stripping the mold from a molded article including means for engaging a part of the mold holding the molded article and other means for engaging another part of the mold and drawing it away from the molded article.

4. In a mold stripping machine, means for stripping the mold from a molded article including means for engaging a part of the mold holding the molded article, means for engaging another part of the mold and drawing it away from the molded article, and power-driven means for turning the second named engaging means and the second named part of the mold back out of the way.

5. In a mold stripping machine, means for stripping the mold from a molded article including a base for engaging a part of the mold holding the molded article, a countershaft mounted on the said base, supporting arms fastened to said countershaft and fastening means for engaging other parts of the mold, whereby the mold may be lifted from the molded article.

6. In a mold stripping machine, means for stripping the mold from a molded article including mountings for supporting the mold and arms for engaging and removing a portion of the mold from the molded article.

7. In a mold stripping machine, means for stripping the mold from a molded article including mountings for supporting the mold, said mountings permitting rotation of the mold and molded article and arms for engaging and removing a portion of the mold from the molded article.

8. In a mold stripping machine, means for stripping the mold from a molded article including mountings for supporting the mold, said mountings permitting rotation of the mold and molded article and arms rotatable about a horizontal axis for engaging and removing a portion of the mold from the molded article.

9. In a mold stripping machine, means for stripping the mold from a molded article including mountings for supporting the mold, said mountings permitting rotation of the mold and molded article and arms provided with adjustable spindles for disengaging the mold from the molded article, said arms being adapted to carry the mold out of the way.

10. In a mold stripping machine, means for stripping the mold from a molded article including mountings for supporting the mold, said mountings permitting rotation of the mold and molded article and arms provided with adjustable spindles for disengaging the mold from the molded article, said arms being rotatable about a horizontal axis so that the mold may be carried out of the way.

In testimony whereof, I have hereunto subscribed my name this 4th day of April, 1928.

EMIL E. HAWKINSON.